C. J. L. F. CETTI.
INDICATOR FOR GASOLENE TANKS.
APPLICATION FILED JULY 31, 1913.
1,112,522.
Patented Oct. 6, 1914.
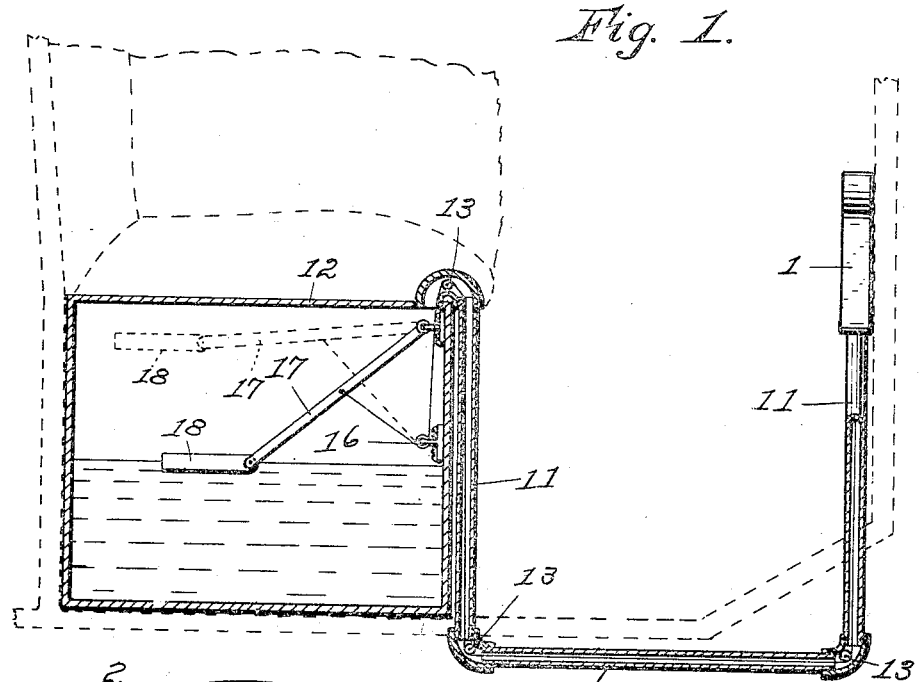
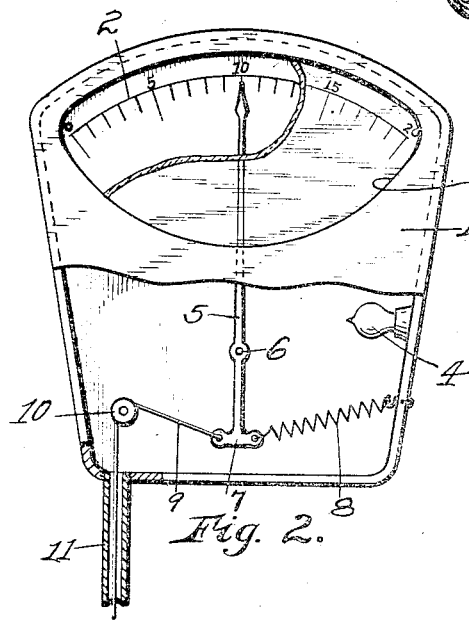
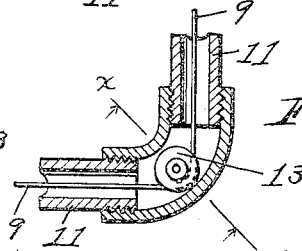
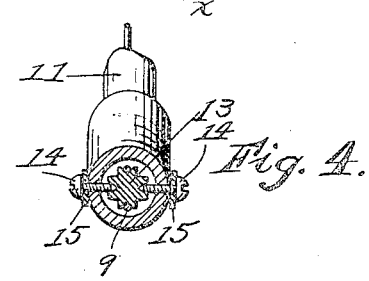
Witnesses:
T. Colson,
B. G. Richards
Inventor:
Carl J. L. F. Cetti,
By Joshua R. H. Potts
his Attorney.

UNITED STATES PATENT OFFICE.

CARL J. L. F. CETTI, OF CHICAGO, ILLINOIS.

INDICATOR FOR GASOLENE-TANKS.

1,112,522.  Specification of Letters Patent. Patented Oct. 6, 1914.

Application filed July 31, 1913. Serial No. 782,198.

*To all whom it may concern:*

Be it known that I, CARL J. L. F. CETTI, a former subject of the King of Sweden, who have declared my intention of becoming a citizen of the United States, and a resident of the city of Chicago, county of Cook, and State of Illinois, have invented certain new and useful Improvements in Indicators for Gasolene-Tanks, of which the following is a specification.

My invention relates to improvements in indicators for gasolene tanks and has for its object the provision of an improved device of this character which is of simple construction and efficient in operation.

The invention consists in the combinations and arrangements of parts hereinafter described and claimed.

The invention will be best understood by reference to the accompanying drawing forming a part of this specification, and in which—

Figure 1 is a transverse section of a tank equipped with an indicator embodying my invention, Fig. 2, an enlarged face view of the indicator casing with portions broken away, Fig. 3, an enlarged view of an elbow of a pipe used in the construction, and Fig. 4, a section taken on line *x*—*x* of Fig. 3.

The preferred form of construction as illustrated in the drawing comprises a metallic casing 1 which is provided with a scale 2 therein and a sight opening 3 arranged over said scale and covered by a glass plate so as to permit a view of said scale. An electric light 4 is arranged in casing 1 and is adapted to illuminate the scale 2 so as to facilitate reading thereof in the dark. An indicator finger 5 is pivotally mounted at 6 in casing 1 in operative relation with scale 2 and is extended beyond its pivotal point and provided with a T-head 7. One branch of T-head 7 is connected with one end of a tension spring 8 the other end being anchored to casing 1 as shown, said spring tending to hold finger 5 normally at the zero of scale 2 as will be readily understood. A chain 9 is secured to the other branch of T-head 7 and is passed over a guide pulley 10 and through a guide pipe 11 which leads to an ordinary gasolene tank 12 which is of any suitable or desired construction. Guide pulleys 13 are arranged at the different turns in pipe 11, said guide pulleys being mounted on screws 14 having conical points engaging conical recesses in the sides of said pulleys and each of said screws being provided with a lock nut 15 for locking the screws in adjusted positions. The casing 1 is arranged on the inside of the dash-board of an ordinary automobile and pipe 11 is passed downwardly therefrom through the floor of the automobile then rearwardly under said floor then upwardly through the floor and is connected with the upper portion of the gasolene tank 12 which is arranged under the seat of the automobile. Chain 9 is passed through pipe 11 over pulleys 13 and downwardly into tank 12, thence over a guide pulley 16 and is secured to an operating lever 17 in tank 12 as shown. Operating lever 17 carries a float 18 at its free end, said float being arranged to ride in the gasolene in tank 12 and operate lever 17 as the level of gasolene in said tank rises or falls as will be readily understood. By this arrangement it will be observed that as the level of the gasolene in tank 12 rises or falls lever 17 will be swung to move finger 5 on scale 2. Scale 2 is so designed with relation to the capacity of tank 12 and the movement of lever 17 as to cause finger 5 to indicate the number of gallons or depth of gasolene in tank 12. Thus the condition of the supply of gasolene in the tank will be constantly before the driver and he will be given ample notice of a failure of supply. The specific form of construction as illustrated is a simple and effective one for the purpose.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

The combination of a tank; a float in said tank; an indicator comprising a scale; a pivoted finger in operative relation with said scale, said finger being extended beyond its pivotal point and provided with a T-head; a spring connected with one side of said T-head and arranged to hold said finger normally at the zero of said scale; and an operative connection between the other side of said T-head and said float, substantially as described.

In testimony whereof I have signed my name to this specification in the presence of two subscribing witnesses.

CARL J. L. F. CETTI.

Witnesses:
 JOSHUA R. H. POTTS,
 HELEN F. LILLIS.